April 2, 1935.  A. E. DUNSTAN ET AL  1,996,193
PRODUCTION OF GLYCOLS
Filed Sept. 12, 1931
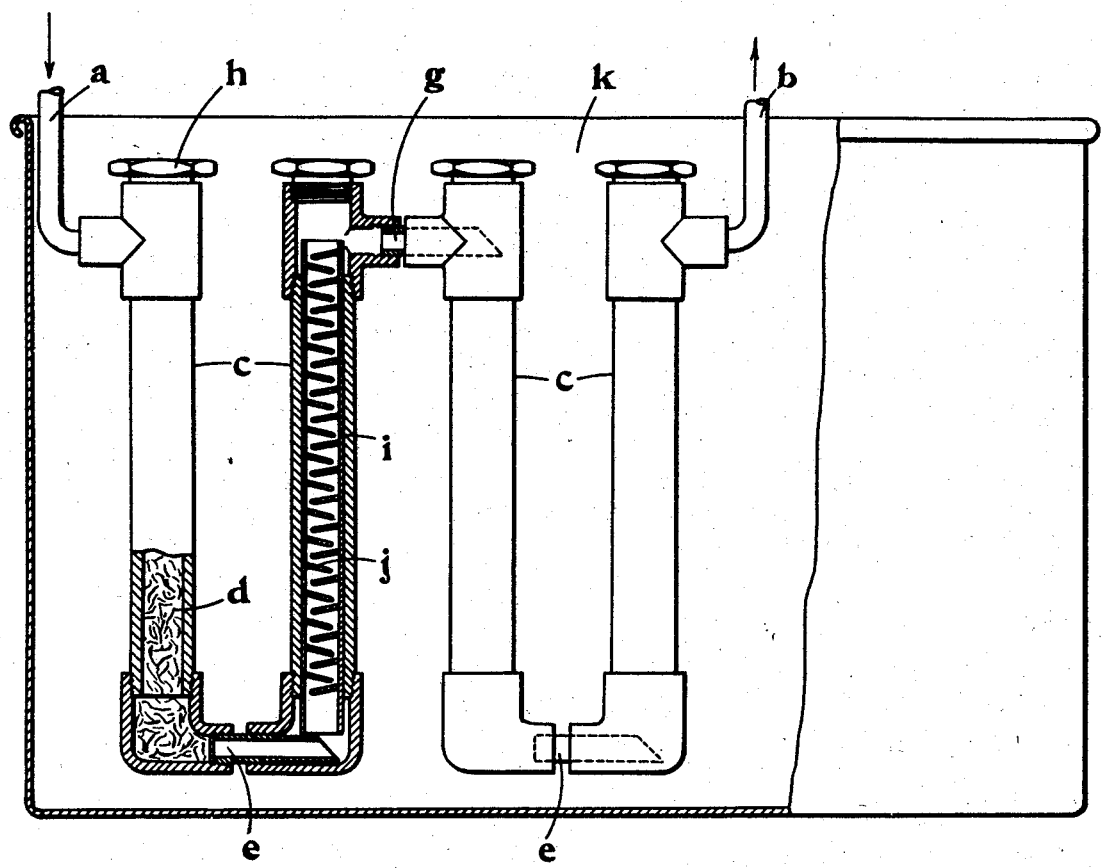
Fig. 1.
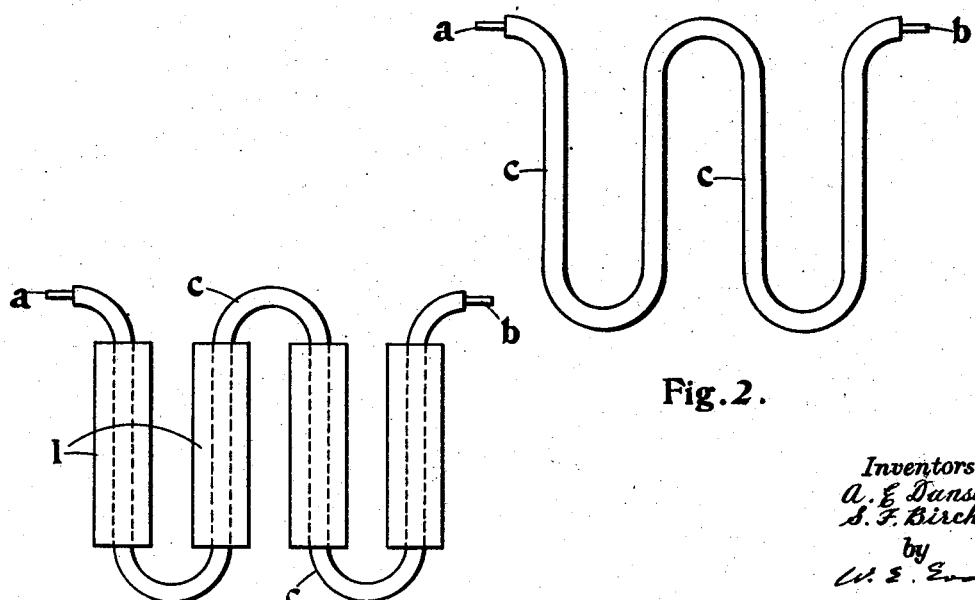
Fig. 2.
Fig. 3.
Inventors
A. E. Dunstan.
S. F. Birch.
by
W. E. Evans
Attorney Patented Apr. 2, 1935

1,996,193

UNITED STATES PATENT OFFICE 1,996,193

PRODUCTION OF GLYCOLS

Albert Ernest Dunstan, London, and Stanley Francis Birch, Sunbury-on-Thames, England, assignors to Anglo-Persian Oil Company Limited, London, England Application September 12, 1931, Serial No. 562,598
In Great Britain September 18, 1930

5 Claims. (Cl. 260—156.5)

This invention relates to the direct production of glycols and especially ethylene glycol, from the corresponding chlorhydrin.

The invention relates to the known process of producing ethylene glycol by the decomposition of chlorhydrin with alkali in the presence of water.

The invention has among its objects under practically effective conditions to secure a substantially complete combination of the olefine oxide which is formed as an intermediate product in the process.

According to the invention a solution of chlorhydrin such as ethylene chlorhydrin is decomposed in the presence of water by means of non-caustic alkali such as sodium carbonate in solution, the reagents being rapidly heated together up to a temperature within the determined range, and passed through a conduit or connected conduits comprising columns or vessels or the like, whereby the reagents and the reaction products are maintained in contact for such a time and under such conditions that the whole of the olefine oxide formed combines with the water present to produce glycol, with substantially no loss by reason of uncombined olefine oxide, the product being in the main a solution of glycol in water, and sodium chloride with a trace of sodium carbonate, together with such chlorination products as may have been derived from the ethylene when the crude mixture resulting from the treatment of ethylene by chlorine in the presence of water is used.

The reagents and reaction products on passing from the vessel or conduit or the like in which they are rapidly heated proceed as an effervescent mass, while still subject to heat applied within the determined temperature range through a series of columns (or the equivalent) that are alternately connected to communicate at their upper and lower ends, so that the chlorhydrin is completely decomposed and the olefine oxide produced is completely utilized to produce glycol in its reaction with the water present, the temperature being controlled in the course of the reaction mass, whereby the reactions are rapidly completed, and on the continuous supply of mixed solutions of the reagents the product is continuously discharged.

The invention comprises the features of method and apparatus hereinafter described.

Apparatus for carrying out the process of the invention are illustrated diagrammatically and by way of example in the accompanying drawing, in which Figure 1 is an elevation partly in section of an apparatus that can be employed, Figure 2 is a diagrammatic view of a modified form of apparatus, and Figure 3 is a diagrammatic view of a further modification.

In carrying the invention into effect a solution of chlorhydrin such as ethylene chlorhydrin in admixture with a solution of sodium carbonate is heated under pressure to a temperature ranging from 105° C. to 150° C. This may be conveniently done by passing the mixture through a coil of piping. The heated mixture flows from the outlet end of the piping to one of a series of columns alternately communicating at their upper and lower ends, whereby the reagents together with the reaction products formed move forward, while the heat applied is maintained at a temperature within the range indicated, the chlorhydrin being completely or practically completely decomposed. The ethylene oxide which is mixed with the carbon dioxide also formed is trapped and delayed in passage through the columns to facilitate contact and combination with the water present to form glycol. Thus as illustrated in Figure 1 of the accompanying drawing for example the effervescent mass on leaving the coil may pass through the inlet pipe $a$ into a series of four columns $c$ or more or less, the effervescent mass moving alternately upward and downward in the adjacent columns, while liquid accumulates in pools in the lower parts of the columns and passes from column to column at their lower ends through the communicating passages or pipes $e$, while frothing develops and the effervescent mass rises from the liquid in alternate columns and passes from column to column at the upper adjacent ends through the communicating passages or pipes $g$. The columns $c$ may be provided with suitable inert packing $d$ or with baffles $j$ or the equivalent. In the second and fourth column $c$ for example in which the froth rises from the liquid pools two alternating series of downwardly and inwardly directed baffles $j$ may be provided to form a zig-zag upward path for the effervescent mass and for trapping the olefine oxide and to facilitate its contact with the water present. Thus at the upper end of the second column $c$ the effervescent mass may pass through the communicating passage or connecting pipe $g$ to the upper end of the third column $c$. The first and third column $c$ may be packed with any inert packing material or with alternating series of baffles, and a discharge pipe $b$ may be provided at the upper end of the fourth column. Thus liquid may form in pools in the lower part of the third and fourth columns c as in the lower part of the first and second columns c, and the effervescent mass on rising from the liquid pool at the bottom of the fourth column may be discharged through an outlet pipe at the upper end of the column into a suitable receptacle and be periodically or continuously withdrawn therefrom, or passed to an evaporator for concentration.

It will be understood that instead of providing a series of columns in the manner hereinbefore described a substantially continuous conduit c may be provided of undulating form as illustrated diagrammatically in Figure 2 and of such a shape or construction that at intervals the lower parts of the conduit serve for the accumulation of liquid pools and the upper parts serve for the forward passage through them of the reaction mass in the condition of froth.

Or again instead of providing a continuous conduit in the manner hereinbefore described the apparatus may comprise a series of closed vessels similar to the column c (Figure 1) that are provided with connecting pipes or means of communication at or near their upper and lower ends, so that thus from the pools of liquid accumulating in the bottom of the vessels the liquid may pass from column to column through the lower connecting and communicating pipes and may be discharged from one vessel to that next adjacent to it at a position above the level of the liquid pool therein, while the froth rising in the respective vessels may pass from one vessel to that next adjacent to it through the upper connecting and communicating pipes. Thus the vessels are so connected that the reaction mass in the form of liquid and froth pass forward together from vessel to vessel. Each of the vessels may be subjected to heat at a determined temperature whereby the progress of the reaction may be controlled and completed in the course of the gas and liquid through the several vessels. By such means the reaction rapidly progresses to completion in the course of the reaction mass through the plant, and that too without the necessity of providing any mechanical means for the purpose.

It will thus be understood that the plant employed for carrying out the invention may in practice take a variety of forms, and that the connected columns or vessels or the conduits used may be mounted within any suitable setting, and any known means provided to control the application of heat to the reaction mass in its course through the plant.

The enclosed columns c or the equivalent may advantageously be provided with liners or frames i (Figure 1) for the support within them of a series of baffles or contact surfaces to form zigzag or other passages through the vessels, columns or the equivalent and to facilitate condensation, and means may be provided such as removable caps k (Figure 1) whereby the liners or the equivalent may be readily inserted or withdrawn from the enclosed vessels, columns or the equivalent through their upper ends, and means may also be provided to control the passages or conduits between the respective vessels, columns or the equivalent.

The apparatus may be mounted within a setting through which heating gas may pass to apply heat to the respective elements thereof in order that the process may be carried on under determined temperature conditions within the range indicated, means being conveniently provided for the control of the heating gas. Or again the elements of the apparatus may be mounted within a heated liquid bath k for the same purpose as illustrated in Figure 1. Or again the units or columns c of the apparatus may be provided with jackets l as diagrammatically illustrated in Figure 3 through which steam or heating gas may pass to apply heat to the respective columns or the equivalent.

We claim:—

1. A process for the continuous production of glycol by the decomposition of a chlorhydrin in the presence of water and with the use of noncaustic alkali, consisting in heating the said reagents to a temperature above 100° C. and under the consequent pressure, and then continuing the application of heat under the same conditions of temperature and pressure to the resulting effervescent liquid mass as the latter moves forward through a conduit, without producing excess of ethylene oxide or increase of pressure as a consequence.

2. A process for the continuous production of glycol by the decomposition of a chlorhydrin in the presence of water and with the use of a noncaustic alkali, consisting in heating the said reagents to a temperature above 100° C. and under the consequent pressure, and then continuing the application of heat under the same conditions of temperature and pressure to the resulting effervescent liquid mass as the latter moves through a conduit, until substantially the whole of the olefine oxide formed combines with the water present to produce glycol.

3. A process for the continuous production of glycol by the decomposition of a chlorhydrin in the presence of water and with the use of alkali, consisting in heating the said reagents under pressure, then continuing the application of heat under pressure to the resulting effervescent liquid mass as the latter moves through a conduit, and forming pools of liquid in the progress of the effervescent liquid mass through the said conduit.

4. A process for the continuous production of glycol by the decomposition of a chlorhydrin in the presence of water and with the use of a noncaustic alkali, consisting in heating the said reagents under pressure and at a temperature within the range of 105° C. to 150° C., and then continuing the application of heat under pressure to the resulting effervescent liquid mass as the latter moves forward through a conduit.

5. A process for the continuous production of glycol by the decomposition of a chlorhydrin in the presence of water and with the use of alkali, consisting in heating the said reagents under pressure, then continuing the application of heat under pressure to the resulting effervescent liquid mass as the latter moves forward through a conduit, and causing the condensation of vapor in the progress of the effervescent liquid mass through the said conduit.

ALBERT E. DUNSTAN.
STANLEY FRANCIS BIRCH.